United States Patent [19]

Shedigian

[11] Patent Number: 4,609,969
[45] Date of Patent: * Sep. 2, 1986

[54] DIELECTRIC FLUID FOR METALLIZED POLYPROPYLENE FILM CAPACITORS

[75] Inventor: Vandos Shedigian, Indianapolis, Ind.

[73] Assignee: Emhart Industries, Inc., Indianapolis, Ind.

[*] Notice: The portion of the term of this patent subsequent to Jun. 4, 2002 has been disclaimed.

[21] Appl. No.: 663,131

[22] Filed: Oct. 22, 1984

[51] Int. Cl.[4] .................... H01G 4/22; H01G 4/08
[52] U.S. Cl. .................... 361/323; 252/579; 361/327
[58] Field of Search ............ 361/433 E, 433 L, 323, 361/327, 314, 315; 252/570, 578, 579

[56] References Cited

U.S. PATENT DOCUMENTS 2,327,372 8/1943 Ruben .................... 361/327
4,327,395 4/1982 Yagitani et al. .......... 361/327 X
4,521,826 6/1985 Shedigian et al. ......... 252/579 X

FOREIGN PATENT DOCUMENTS 590757 7/1947 United Kingdom ............ 361/315

Primary Examiner—Donald A. Griffin
Attorney, Agent, or Firm—Robert F. Meyer

[57] ABSTRACT

A dielectric fluid for a metallized polypropylene film capacitor consisting essentially of Glyceryl Tri(acetoxystearate).

6 Claims, 1 Drawing Figure

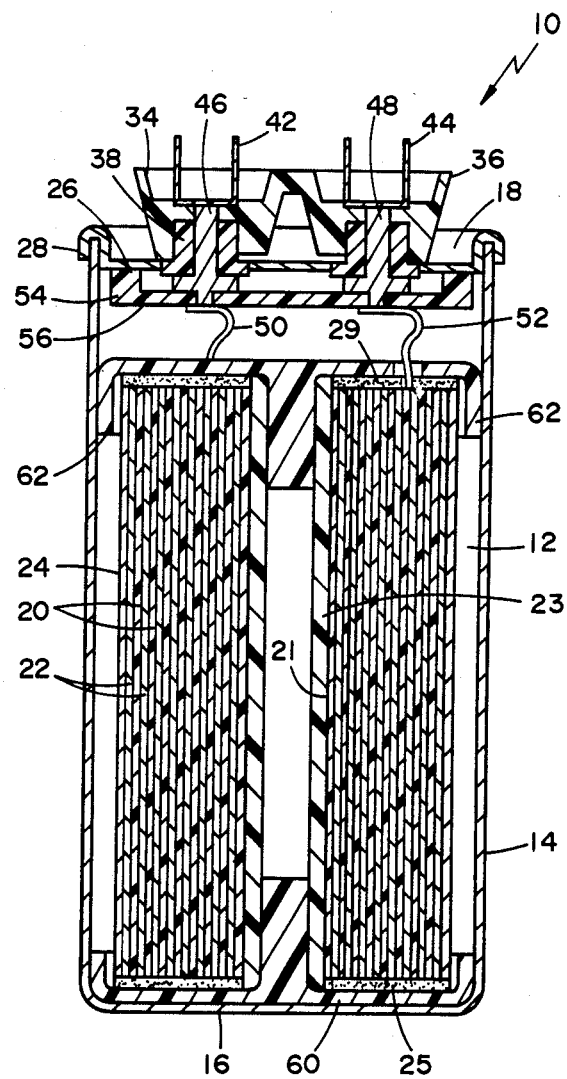

DIELECTRIC FLUID FOR METALLIZED POLYPROPYLENE FILM CAPACITORS

BACKGROUND OF THE INVENTION

This invention relates to dielectri fluids for electrical capacitors, particularly metallized polypropylene (PP) film capacitors capable of operating under high AC voltage stress (above 1300 volts/mil).

There are many desirable properties of dielectric fluids for metallized PP film capacitors. Of these, the most desirable appears to be that of low swellability of the PP film when in contact with the fluid. Such low swelling effect minimizes the loosening of the metallized layer which decreases the capacitance of the capacitor with the passage of time. Another property is that of its gas absorption ability. Good gas absorption ability assures that any gases that are evolved within the capacitor are absorbed by the dielectric fluid.

SUMMARY OF THE INVENTION

The present invention provides an AC metallized polypropylene film capacitor having a dielectric fluid consisting essentially of Glyceryl Tri (acetoxystearate). As will be shown, this fluid has an excellent low swellability factor with respect to the PP film and, unexpectedly, has low capacitance loss even though the fluid is a gas evolver rather than being a good gas absorber.

DESCRIPTION OF THE DRAWINGS

The sole FIGURE is a cross-section of an AC metallized film capacitor useful for the present invention.

DETAILED DESCRIPTION OF THE INVENTION

A typical metallized polypropylene film capacitor that utilizes the dielectric fluid of the present invention is shown in the drawing. The capacitor assembly 10 includes capacitor body 12 which is carried in a container 14 having a bottom 16 and an open end 18. Container 14 may be made of metal or metal alloy, or it may be fabricated of a suitable thermo-plastic material. Capacitor body 12 comprises a plurality of metal electrodes 20 and 22 which are separated by spacers 24. The electrodes 20 and 22 are usually part of the dielectric sheet as a metal layer vacuum deposited thereon. The electrodes in the spacer members are wound tightly to provide an axial center 21 by either winding the electrodes and spacer members on a removable mandrel or on a rigid, hollow core 23. The electrodes and spacers are wound so that electrodes 20 and 22 are offset with respect to each other in order that each roll edge or end displays an offset. Electrical contact is made with electrodes 20 and 22 after they are rolled by spraying the ends of the roll with zinc 25 and 27. Container 14 is then filled with a dielectric fluid of the present invention. Suitable metals would be aluminum or zinc, or a combination of the two. Suitable materials for the dielectric spacers 24 include polymeric films such as polypropylene, polyethylene terephthalate, polyimide, polycarbonate, and polysulfone, preferably polypropylene.

The open end of the container is closed by a lid 26. The lid being sealed into the outer rim 28 of the container by crimping, searing, or other suitable means. The lid contains an opening (not shown) through which a terminal assembly may be inserted. The terminal assembly includes an insulator with cups 34 and 36 which are carried on bushing 38. Terminals 42 and 44 are electrically connected to rivets 46 and 48 which are electrically connected to tabs 50 and 52. Tabs 50 and 52 are electrically connected to electrodes 20 and 22. The assembly also includes an interruptor 54 which in this embodiment includes a plastic disc 56 carried by the rivets 46 and 48.

Capacitor body 12 is anchored within the container 14 through a pair of thin-walled, cup-shaped members 60 and 62. Other suitable means may be used to insulate and hold the capacitor body 12 in the container.

The failure of metallized polypropylene capacitors in AC applications is due primarily to partial discharges or corona and excessive clearing. It has been found that by utilizing the dielectric fluid to occupy the air spaces within the capacitor between the offset electrodes 20, 22 corona is greatly minimized. Another problem is the decrease in capacitance with time attributed to corona-induced electrode erosion. The decrease in capacitance can be retarded or slowed down by tightly winding metallized polypropylene film on solid cores followed by heat stabilization. In a liquid filled tightly wound capacitor, it is not desirable to have any liquid penetrate significantly into the roll. Liquid penetration should be limited to the roll edges where significant corona may occur. The dielectric fluid of the present invention achieves these desired results. This is believed to be due to the fact that [glyceryl tri (acetoxystearate)] has very low imbibition into polypropylene film resulting in low swellability of the polypropylene film. And, unexpectedly, low capacitance loss is provided even though the fluid is known to be a gas evolver rather than a gas absorber which, as previously noted, is usually needed in capacitor impregnants to prevent the cumulative effect of partial discharges producing a gas and eventually leading to capacitor failure.

An antioxidant such as butylated hydroxytoluene (BHT) may be added to act as a radical scavenger. It was determined that the preferred percentage of the constituents in the dielectric fluid are approximately about 90% to about 100% (glyceryl tri(acetoxystearate)) and about 0.01% to about 10% butylated hydroxytoluene by weight of the total dielectric fluid.

A number of metallized polypropylene capacitors rated 440 VAC/15 μF (10 microns) were impregnated with a dielectric fluid made in accordance with the present invention i.e. [glyceryl tri (acetoxystearate)], which is a saturated derivative of Castor Oil. The fluids were purified by conventional methods with the addition of 0.1% BHT by weight of the total dielectric fluid. Tables I and II show the swellability and percent capacitance loss of the dielectric fluid as compared to other metallized PP film capacitors impregnated with unsaturated dielectric fluids.

TABLE I

Volume % Swellability of Polypropylene Film After Immersion in Fluids At Various Temperatures

| Fluids | Saturation | Volume % Swellability of PP Film | | |
| --- | --- | --- | --- | --- |
| | | 25° C. | 60° C. | 95° C. |
| [Glyceryl Tri (acetoxystearate)] | Saturated | 0.04 | 0.4 | 0.9 |
| [Glyceryl Tri (Acetyl Ricinoleate)] | Unsaturated | 0.5 | 0.7 | 2.1 |
| Dioctyl Phthalate | Unsaturated | 0.4 | 4.0 | 7.1 |

TABLE II

% Capacitance Loss in Metallized Polypropylene Film Capacitors, 440 VAC/15 uF (10 Microns) on Life Test 550 VAC, 2000 Hours, 80° C.

| Fluid | Saturation | % Capacitance Loss |
| --- | --- | --- |
| [Glyceryl Tri (acetoxystearate)] | Saturated | 2.05 |
| [Glyceryl Tri (Acetyl Ricinoleate)] | Unsaturated | 9.10 |
| Dioctyl Phthalate | Unsaturated | 5.30 |

It can readily be seen the dielectric fluid of the present invention provides a much lower swellability factor as well as much lower capacitance loss.

Unexpectedly, the dielectric fluid of the invention provides for low percent capacitance loss even though the dielectric fluid is a gas evolver. This is clearly shown in Table III.

TABLE III

Gas Absorbtion and % Capacitance Loss

| Fluid | Gas absorbtion at 80° C. (Microliters/Min) Pirrelli Cell-Hydrogen | % Cap Loss 55 VAC, 80° C. 2000 Hrs. |
| --- | --- | --- |
| (Glyceryl Tri (Acetoxystearate)) | Saturated  +35* | 2.05 |
| Castor Oil | Unsaturated  −24.6* | 3.80 |
| (Glyceryl Tri (Acetyl Ricinoleate)) | Unsaturated  −48.4 | 9.10 |
| Dioctyl Phthalate | Unsaturated  −3.0 | 5.30 |

*(+) Evolving and (−) Absorbing Gas.

What is claimed is:

1. In a metallized polypropylene film capacitor including a casing containing a capacitor roll section having a pair of spaced apart electrodes, a polypropylene sheet for separating the electrodes, and a dielectric fluid adjacent said electrodes, in said casing, the dielectric fluid comprising about 90% to about 100% by volume Glyceryl Tri (acetoxystearate).

2. The capacitor in claim 1 wherein the dielectric fluid swells the polypropylene film from about 0.04% to about 0.9% by volume dependent on temperature.

3. The capacitor of claim 2 wherein the dielectric fluid includes from about 0% to about 10% antioxidant by weight of dielectric fluid.

4. The capacitor of claim 3 wherein the antioxidant is a butylated hydroxytoluene.

5. A dielectric fluid comprising about 90% to about 100% by volume glyceryl tri (acetoxystearate).

6. The dielectric fluid of claim 5 including from 0% to about 10% by weight butylated hydroxytoluene.

* * * * *